United States Patent [19]

LaCasse

[11] 4,046,209
[45] Sept. 6, 1977

[54] OSCILLATION LOCKOUT SYSTEM FOR TRACK MOUNTED ROCK DRILL

[75] Inventor: George N. LaCasse, Holyoke, Mass.

[73] Assignee: Worthington Compressors, Inc., Holyoke, Mass.

[21] Appl. No.: 639,755

[22] Filed: Dec. 11, 1975

[51] Int. Cl.² .............................................. B62D 55/08
[52] U.S. Cl. .................................... 180/9.52; 173/22; 280/6.11
[58] Field of Search ........................ 180/9.5, 9.52, 41; 280/6.11, 6.1, 112 A; 173/22, 23, 27

[56] References Cited

U.S. PATENT DOCUMENTS

| | | | |
|---|---|---|---|
| 2,312,389 | 3/1943 | Cordes | 180/9.5 X |
| 2,842,340 | 7/1958 | Burress | 180/9.5 X |
| 3,088,531 | 5/1963 | Garrett | 180/9.5 X |
| 3,117,647 | 1/1964 | Polko | 180/41 X |
| 3,189,116 | 6/1965 | Steffen | 180/41 X |
| 3,289,779 | 12/1966 | Feucht | 180/9.5 |
| 3,825,088 | 7/1974 | Copeland | 180/9.5 |

Primary Examiner—John P. Silverstrim

[57] ABSTRACT

A track type vehicle having pivotable A-frame members and a walking beam structure to permit oscillation of one track relative to the other is equipped with a pair of single acting hydraulic cylinders, each of which is connected between the main frame of the vehicle and one of the track assembly. The cylinders are interconnected by a line having a selector valve. The valve is opened to permit transfer of fluid between the cylinders to permit relative oscillation of the tracks, and the valve is closed to prevent transfer of fluid between cylinders when it is desired to prevent oscillation of the tracks.

1 Claim, 3 Drawing Figures

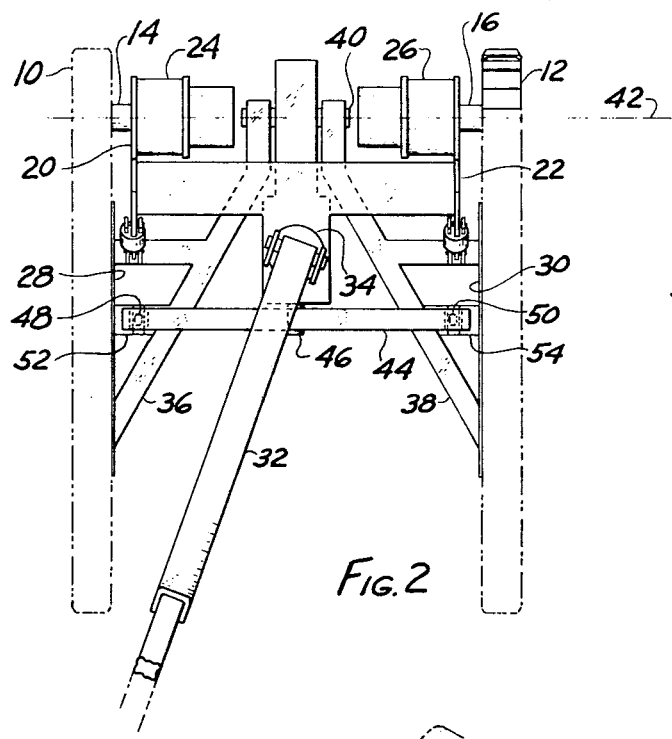
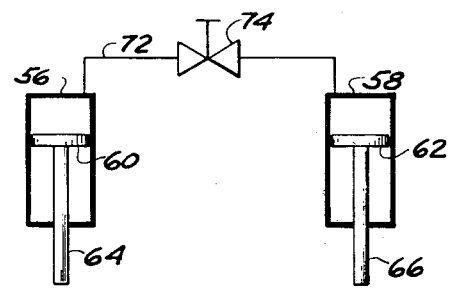
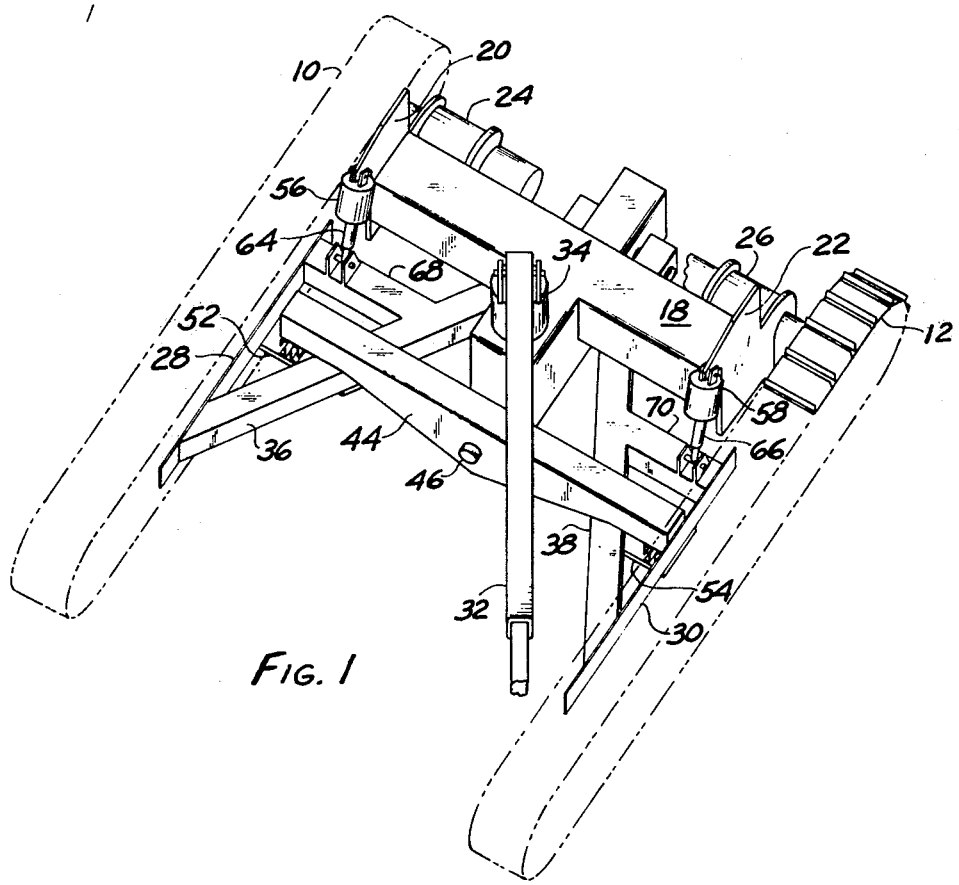

OSCILLATION LOCKOUT SYSTEM FOR TRACK MOUNTED ROCK DRILL

BACKGROUND OF THE INVENTION

This invention relates to the field of track type vehicles, especially track type vehicles having rock drills mounted thereon. More particularly, this invention relates to a track type vehicle in which the tracks are vertically movable, i.e. oscillate, relative to each other to accommodate the terrain.

Track mounted rock drills are often required to traverse uneven and sloped terrain is moving from one position to another, and they are often required to perform their drilling operations on uneven or sloped terrain. To facilitate operation in such terrain, the track mechanism is often endowed with the capability of oscillation, i.e. movement in the vertical plane of one track relative to the other, to permit the tracks to conform to the ground conditions. One well known and particularly effective way to accomplish such oscillation is to construct the track vehicle with pivotable A frame members and a walking beam structure. The walking beam extends between the track assemblies and is pivotally mounted on the main frame of the vehicle. Each leg of the A frame is also connected to one of the track assemblies and is pivotally connected to the main frame of the vehicle. With this arrangement, i.e., pivotal A-frame and walking beam, when a track is forced upward as a result of a change in terrain, the walking beam forces the other track to remain firmly on the ground. This arrangement offers strength in the components of the oscillating system and substantially trouble free service.

Notwithstanding the desirability and advantages of the A-frame and walking beam oscillation construction for track vehicles, one significant disadvantage is encountered with track mounted rock drills having swing booms. If the boom and drill guide assembly is swung to a position where it extends beyond the outer side of one of the tracks, the oscillation system, due to its freedom of movement, and the moment generated by the overhanging boom and drill guide assembly, causes the other track to rise off the ground significantly. In other words, if the boom and drill guide assembly is swung out beyond the forward side of the right track, the rear side of the left track will lift off the ground; and the rear right track will elevate if the boom is swung beyond the side of the left track. This unwanted oscillation in the system prevents the achievement of a firm drilling platform since stinging, i.e. impacting, the ground with the drill guide will result in forcing the raised track to come down, and alignment in the drilling operation is lost. This unwanted oscillation with its resultant loss of alignment in drilling operations is intolerable in many situations.

Several attempts have been made in the prior art to lock out the unwanted track oscillation during drilling operations. One approach has been to incorporate very large adjusting screws which are mounted on the main frame and extend to the walking beam. These screws may be adjusted to prevent pivotal motion of the walking beam. While effective, this approach has the severe disadvantage that actuation of the adjusting screws is time consuming, cumbersome and sometimes difficult to achieve. Accordingly, the operator very often forgets to or elects not to unlock the walking beam, in which event the tracks remain locked out of their oscillation capability, and rough ground maneuverability is lost. This loss of rough ground maneuverability is not only an inconvenience, but it can also be a very serious safety hazard since the vehicle becomes much more susceptible to tipping. The operator may forget that the vehicle has lost maneuverability and may try to direct it over terrain which now becomes dangerous.

Another approach in the prior art is shown in U.S. Pat. No. 2,842,340 to Burress. In this system, the walking beam is eliminated and replaced by a pair of double acting cylinders attached between the main frame of the vehicle and the track assemblies. The system of U.S. Pat. No. 2,842,340 eliminates the walking beam, and track oscillation is accomplished by surging or transferring of fluid from one of the double acting cylinders to the other. Track oscillation may be blocked out by the valve which prevents flow communication between the cylinders. The principal disadvantage of the system of the Burress patent is that the hydraulic system must be relied upon to provide both track oscillation and oscillation lock out. The hydraulic cylinders must be large enough to assume the burden of the whole weight of the system, and both the oscillation system and the lock out system are lost if the hydraulic lines are severed or one of the cylinders malfunctions.

SUMMARY OF THE INVENTION

The above discussed and other disadvantages of the prior art are eliminated or minimized by the oscillation lock out system of the present invention. In accordance with the present invention, a track type vehicle is equipped with a conventional pivotal A-frame and walking beam system to provide oscillation capability to adapt the vehicle to terrain requirements. Each leg of the A-frame is connected at one end to one of the track assemblies, and the other end is pivotally connected to the main frame of the vehicle. The walking beam is also coupled to the track assemblies and is pivotally mounted on the main frame. A pair of single acting hydraulic cylinders and pistons are mounted on opposite sides of the vehicle. Each cylinder is connected to the main frame, and each piston is connected to one of the track assemblies, and the cylinders are interconnected by a hydraulic line which includes a shut off valve.

During operation when the vehicle is being moved and track oscillation is desired to accommodate the terrain, the valve in the hydraulic line is opened to permit fluid to flow from one cylinder to the other. As the tracks oscillate, the pistons move relative to the cylinders and fluid is transferred from one cylinder to the other so that operation of the oscillation system proceeds in normal fashion. When oscillation is no longer desired, such as when the vehicle has been positioned and drilling is to commence, the valve is closed to prevent transfer of fluid between the cylinders. The closing of the valve locks the pistons and cylinders against relative movement thereby establishing a rigid connection between the main frame and the track assemblies. This rigid connection prevents oscillation of either track relative to the main frame, and thus a firm drilling platform is established whereby drilling alignment can be achieved and maintained.

The interaction and cooperative arrangement between the interconnected single acting pistons and the oscillation system in the present invention results in a lock out system which is superior to those available in the prior art. An important feature to be noted is that malfunctioning of the lock out system does not disable the oscillation system of the vehicle. Thus, if the lock out system is disabled, such as by severing the hydraulic lines, the vehicle still remains fully operational and does not lose any of its maneuverability which is imparted by the oscillation system. Furthermore, the single acting cylinders with a single hydraulic line interconnecting them provides a reliable system which is easy to maintain.

Accordingly, one object of the present invention is to provide a novel and improved oscillation lock out system for track type vehicles.

Still another object of the present invention is to provide a novel and improved oscillation lock out system for drill mounted track type vehicles. Still another object of the present invention is to provide a novel and improved oscillation lock out system for drill type vehicles in which malfunctioning of the lock out system does not impair operation of the oscillation system.

Other objects and advantages of the present invention will be apparent to and understood by those skilled in the art from the following detailed description and drawings.

BRIEF DESCRIPTION OF THE DRAWINGS

Referring to the drawings, wherein like elements are numbered alike in the several figures:

FIG. 1 is a perspective view, as seen from a slightly elevated position, of a drill mounted track type vehicle incorporating the present invention.

FIG. 2 is a top plan view of the track type vehicle of FIG. 1.

FIG. 3 is a schematic representation of the hydraulic system incorporated in the present invention.

DESCRIPTION OF THE PREFERRED EMBODIMENT

Referring jointly to FIGS. 1 and 2, a general representation of a track type vehicle is shown. It will be understood that many of the structural and constructional details of track type vehicles are not shown in FIGS. 1 and 2 since they form no part of the invention. Rather, just the essential framework elements are shown, that being sufficient to fully describe and illustrate the present invention.

The track type vehicle has a pair of laterally spaced track units 10 and 12, each of which is pivotally connected on axles 14 and 16 to a main frame assembly 18. Main frame assembly 18 has a pair of plate members 20 and 22 on which axles 14 and 16 are supported, and drive units 24 and 26 are supported on plates 20 and 22 to drive sprocket wheels (not shown) at the rear of each track unit. Although not shown, each track unit includes standard wheel arrangements for securing and operating the track, and each track unit has a frame unit 28 and 30 to which the wheel assemblies are connected.

A boom 32 is rotatably mounted on main frame 18 via a turret 34, and boom 32 can be raised up or down or swung side to side by means of actuating cylinders (not shown). A drill guide (also not shown) will typically be mounted at the end of boom 32 to carry a drill and other standard associated equipment for drilling.

As noted above, track units 10 and 12 are independently pivotal with respect to main frame 18, this independent pivotable characteristic being incorporated into the vehicle so the track units can move vertically, i.e. oscillate, independently of each other to accommodate changes in slope or terrain. In order to prevent excessive towing in or towing out of the front end of the track units, an A-frame structure is incorporated in the vehicle. The A-frame includes a pair of legs 36 and 38 which are rigidly connected to track frame units 28 and 30 at their forward ends and pivotally connected to main frame 18 at the rear ends by axle 40. Legs 36 and 38 are independently rotatable on axle 40, and axles 14, 16 and 40 are all located on a common axis 42 to coordinate and accommodate the various oscillation movements in the system. A walking beam 44 is pivotally connected to main frame 18 on axle 46, and the ends of walking beam 44 are coupled to the track frame units 28 and 30 by spherical bearing units 48 and 50. Reference is made to U.S. Pat. No. 3,177,961, which is hereby incorporated herein by reference, for a more detailed discussion of the construction and operation of the spherical bearing units 48 and 50. Spherical bearing units 48 and 50 transmit thrust while permitting limited rotation or other movement.

The ends of the walking beam are connected through the spherical bearing units 48 and 50 to struts or pads 52 and 54 which are connected, respectively, between A-frame leg 36 and track frame unit 28 on one side of the vehicle and between A-frame leg 38 and track frame unit 30 on the other side of the vehicle. These bearing units could also be mounted directly on the A-frame leg members, the important factor being that the ends of the walking beam be connected directly or indirectly into the track frame units 28 and 30 to transmit forces to the track frame units.

Walking beam 44 and A-frame elements 36 and 38 cooperate with the independently pivotable tracks 10 and 12 to define an effective oscillation system to permit the vehicle to travel over uneven terrain laden with rocks or other obstacles. If one track, for example track 12, encounters a terrain condition which causes the front end to elevate, track 12 will pivot about axle 16 as the front end of track 12 moves upward. Track frame unit 30 also moves upward along with track unit 12 to assume the same angle relative to the vertical as track unit 12. A frame leg 38 and strut or pad 54 also elevate, whereby walking beam 44 is rotated counterclockwise about its mounting on axle 46. This counterclockwise rotation of walking beam 44 imposes a thrust load in a downward direction on strut or pad 52 which is in turn transmitted to A-frame leg 36 and track frame element 28 to vigorously force track unit 10 downwardly to maintain it in firm contact with the ground. In a similar fashion, track 12 would be forced downward by clockwise rotation of walking beam 44 in the event that track 10 pivoted upwardly on contact with uneven terrain.

If boom 32 is swung left or right to the point where the drill guide and drilling mechanism overhangs the track elements, i.e. extends either left or right beyond the space defined between track units 10 and 12, a condition of unbalance may occur. The weight of the boom, drill guide and drilling mechanism may result in a couple which causes one of the track elements to rise. For example, with the boom positioned as in FIG. 1, or swung perhaps 10° or 15° further counterclockwise, the rear end of track 10 would be apt to rise up. When the drill guide was then caused to sting, i.e. impact, the ground to establish a drilling reference, the elevated rear end of track unit 10 would then be driven back down, so that drilling alignment would be lost. In order to prevent this unwanted occurrence of track oscillation, a pair of single acting cylinder-piston units are coupled between main frame 18 and the track frame units. The cylinders 56 and 58 are pivotally connected to plates 20 and 22, respectively, and the pistons 60 and 62 are connected through their rods 64 and 66 to struts 68 and 70. Strut 68 extends between and is connected to A-frame leg 36 and track frame elements 28, and rod 64 is pivotally connected to strut 68 so that rod 64 is pivotally tied into track frame unit 28. Similarly, strut 70 extends between and is connected to A-frame leg 38 and track frame unit 30, and rod 66 is pivotally connected to strut 70 so that rod 66 is pivotally tied into track frame unit 30. As best shown in FIG. 3, the upper chamber of each of cylinders 56 and 58 is interconnected by a hydraulic line 72 in which is positioned a manually actuated valve 74. When it is desired to permit track units 10 and 12 to oscillate relative to each other, valve 74 is placed in the open position to provide fluid communication between the chambers defined in each cylinder above the pistons, those chambers and the line 72 being filled with hydraulic fluid. If either track is elevated, its associated piston rod and piston will be driven upwardly, and the fluid will be transferred from one cylinder to the other. Thus, for example, if track 12 is elevated, rod 66 and piston 62 will be driven upwardly the fluid in the cylinder above piston 52 will be transferred through conduit 72 to the chamber in cylinder 56 above piston 60; and the position of the main frame 18 relative to track frame 28 will be adjusted to accommodate enlargement of the chamber above piston 50 in cylinder 56. Similarly, upon elevation of track 10, piston 60 will be driven up and the fluid will be transferred from cylinder 56 to cylinder 58 with resultant adjustment of the position of main frame 18 relative to track frame 30 to accommodate the enlargement of the chamber above piston 62 in cylinder 58. In this manner the hydraulic fluid is merely transferred back and forth between the two cylinders without interferring with the oscillation system when oscillation is desired. However, when it is desired to prevent relative oscillation between the tracks, such as to avoid the drilling misalignment problem discussed above, valve 74 is actuated to the fully closed position to block fluid flow between cylinders 56 and 58. With valve 74 closed, neither of the pistons 60 and 62 can move upward since the hydraulic fluid is blocked from passing through valve 74. Accordingly, any force which would tend to elevate either of the track elements is resisted because the track elements are now, in effect, rigidly coupled to main frame 18. In this way, the oscillation capability of the system is locked out, and the track vehicle maintains a firm base even though the boom and drill guide may be swung outside the boundaries of the track elements.

It will be noted that the function of the lock out cylinders and piston units is to be able to selectively establish a rigid connection between main frame 18 and track units 10 and 12. Accordingly, the piston rods have been shown connected to struts 68 and 70 because that connection provides the most advantageous angular and leverage connections. However, it will be understood that the connection could also be between main frame 18 and legs 36 and 38 of the A-frame or between main frame 18 and the ends of the walking beam. Any of these connections would serve to provide the capability for an essentially rigid connection between the main frame and the track frame elements.

When it is desired to restore the relative oscillation capability to the tracks, valve 74 is merely reopened to reestablish fluid communication between cylinders 56 and 58. The tracks are then again free to oscillate since the fluid can be transferred between the cylinders and there is no longer any rigid connection between the main frame and the track frame elements.

Another important aspect and function of the lock out system is to control or limit the rate of oscillation of the tracks rather than eliminate oscillation entirely. If the rate of oscillation of one or both tracks becomes too high, a serious instability condition may develop in which inertia effects can cause a track assembly to elevate sufficiently to tip the vehicle over. In other words, a flywheel effect may occur with a rapid rate of oscillation of one or both tracks. To avoid this instability, valve 74 may be partially closed, the degree of closing being determined by the control to be exercised. Partial closing of valve 74 imposes a load on the fluid systems and restricts the flow of fluid between cylinders 56 and 58. The fluid can no longer freely flow between the cylinders. If one of the pistons rises in its cylinder, as would be caused by upward oscillation of its associated track, the transfer of hydraulic fluid from the one cylinder to the other will be slowed down by the partial closing of valve 74. Thus, the oscillating track can only rise at the slower rate permitted by the fluid flow, and an extremely important oscillation control is effected. The rate of permitted oscillation can be varied by varying the degree of opening or closing of valve 74.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An oscillation control system for a track type vehicle having a main frame, a pair of endless track assemblies pivotally connected to said main frame on opposite sides thereof, and walking beam means having a first end coupled to one of said track assemblies, a second end coupled to the other of said track assemblies, and an intermediate portion pivotally connected to said main frame, said system comprising:
   first single acting fluid actuated cylinder and piston means pivotally connected between said main frame and said one track assembly;
   second single acting fluid actuated cylinder and piston means pivotally connected between said main frame and said other track assembly;
   fluid conduit means interconnecting the cylinders of said first and second cylinder and piston means for fluid transfer between the cylinders, said first and second cylinder and piston means and said first conduit means forming a closed hydraulic circuit; and
   valve means in said fluid conduit to control the transfer of fluid between the cylinders;
   said valve means being variably adjustable between an open position and a closed position, the cylinder and piston of each of said cylinder and piston means being movable relative to each other to transfer fluid between the cylinders when said valve means is in a position other than said closed position to permit relative pivotal movement between said main frame and said track assemblies, and the cylinder and piston of each of said cylinder and piston means forming a rigid connection between said main frame and each of said track assemblies when said valve is in the closed position to prevent relative pivotal movement between said main frame and each of said track assemblies, said valve means in positions between full open and full closed varying the rate of oscillation of said track assemblies.

* * * * *